Oct. 31, 1967 L. J. SEMON 3,350,515

TELEPHONE LINE TESTING UNIT

Filed July 6, 1964

INVENTOR.
LAWRENCE J. SEMON
BY Elliott & Pastoriza
ATTORNEYS 3,350,515

TELEPHONE LINE TESTING UNIT

Lawrence J. Semon, 918 Ocean Front,
Santa Monica, Calif. 90403

Filed July 6, 1964, Ser. No. 380,206
2 Claims. (Cl. 179—175.1)

ABSTRACT OF THE DISCLOSURE

This disclosure relates to a testing unit for telephone answering switchboard operators to determine whether or not a subscriber's line to the telephone answering switchboard is in operative condition and also to serve as a substitute for the switchboard light indicating a call to the subscriber in the event the switchboard light is burned out. The test unit includes a plug at one end connected to a jack at its opposite end for receiving the plug normally inserted into the switchboard, the plug of the unit itself being inserted in the switchboard. An indicating lamp is connected directly across the tip and ring conductors and will be energized when the plug is inserted in the switchboard jack in the absence of any plug received within the unit jack to indicate to an operator that a subscriber's line is operating correctly. A push button switch is provided to connect the indicating lamp across the tip and sleeve conductors for the same type of indication to be used in specialized types of switchboards. A slide switch is also incorporated in the unit which may be moved from a rear position in which the indicating lamp is connected directly across the tip and ring conductors to a forward position in which a resistance and condenser in series are connected with the indicating lamp between the tip and ring conductors. The unit then functions as a monitoring device for incoming telephone calls wherein the indicating lamp will be energized on the first ring and the operator can utilize this indicating lamp as a substitute for the switchboard lamp in the event the latter is burned out.

This invention relates to telephone equipment and more particularly to a novel telephone line testing unit particularly useful in telephone answering service exchanges.

Telephone answering services function to answer a subscriber's line in the event that the subscriber himself is absent. Generally, the subscriber's line is connected from a central office into the answering service switchboard. Incoming calls are passed to the central office and from the central office are also routed to the answering service if the call is to the subscriber's line. With this arrangement, a service operator at the answering exchange may answer any call to the subscriber.

It is normal practice for the answering service not to answer any incoming calls until after a third ring. On the other hand, the answering service may answer the call immediately if the answering service is informed by the subscriber that he will not be in his office.

In some instances, a subscriber's line may be out of order. At the present time, there is no convenient means for the operator at the answering service exchange to determine whether a subscriber's line is out of order unless an incoming call is not completed. Further, the indicating lamp or bulb in the exchange board corresponding to the subscriber's line may burn out so that the operator at the exchange will not know whether a subscriber is receiving a call.

Unfortunately, switchboards across the country vary in certain characteristics. For example, voltage for the indicating lamps for identifying incoming calls is sometimes derived between the tip and ring contacts in the board jack, and at other times as, for example, in "secrecy feature" boards, between the tip and sleeve contacts. In other instances, even if the subscriber's line is functioning properly, the circuitry is such that the indicating lamp will only be energized on the second ring. It would be very desirable if a telephone answering exchange could answer calls on the very first ring in the event they have been instructed to intercept calls to avoid undue ringing at the subscriber's home or office.

Bearing all the foregoing in mind, it is a primary object of this invention to provide a novel telephone line testing unit which will enable a subscriber's line to be very easily tested to determine whether it is out of order itself, and, as an auxiliary feature, to determine whether or not the indicator lamp for the subscriber's line is burned out.

More particularly, it is an object to provide a telephone line testing unit meeting the foregoing object which is readily adaptable to different types of switchboard equipment as used across the country to the end that great versatility is provided.

Still another object is to provide a testing unit which may be used in a manner to enable interception of a call on the very first ring.

Another object is to provide a test unit suitable for use on boards incorporating "secrecy feature" circuitry.

Still another object is to provide a telephone line testing unit which is compact, relatively inexpensive to manufacture, extremely reliable, and simple to operate by any normally trained operator at a telephone answering exchange.

Briefly, these and many other objects and advantages of this invention are attained by providing a casing including an inlet jack and an outlet plug. Suitable tip, ring, and sleeve conductors are incorporated in the casing and connect directly the inlet jack to the outlet plug. An indicating means, preferably in the form of a lamp, is adapted to be connected through suitable switch means between the tip and ring conductors. Other switch means are provided for enabling this lamp to be connected across the tip and sleeve conductors depending upon the type of switchboard with which the unit is employed.

In addition, the unit includes other switch features for providing an indication of an incoming call on the very first ring so that it may be intercepted immediately by an operator at the exchange.

A better understanding of the telephone line testing unit will be had by now referring to a preferred embodiment thereof as illustrated in the accompanying drawings, in which.

Figure 1:
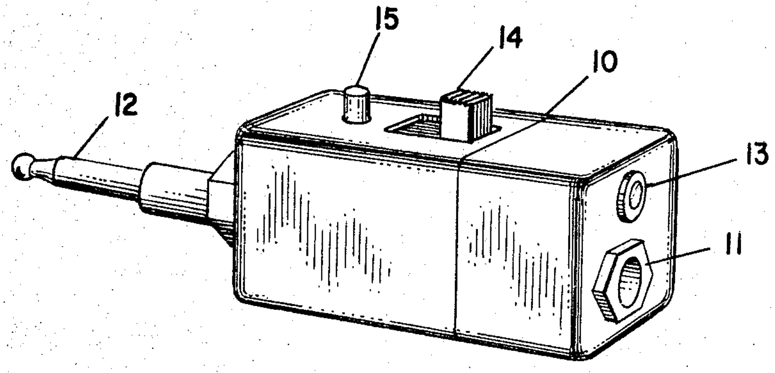
FIGURE 1 is a perspective view of the telephone line testing unit.

Referring first to FIGURE 1, the unit includes a casing 10 incorporating an inlet jack 11 and an outlet plug 12. Also included is an indicating means in the form of a light bulb 13, a slide switch 14, and a push button switch 15.

Figure 2:
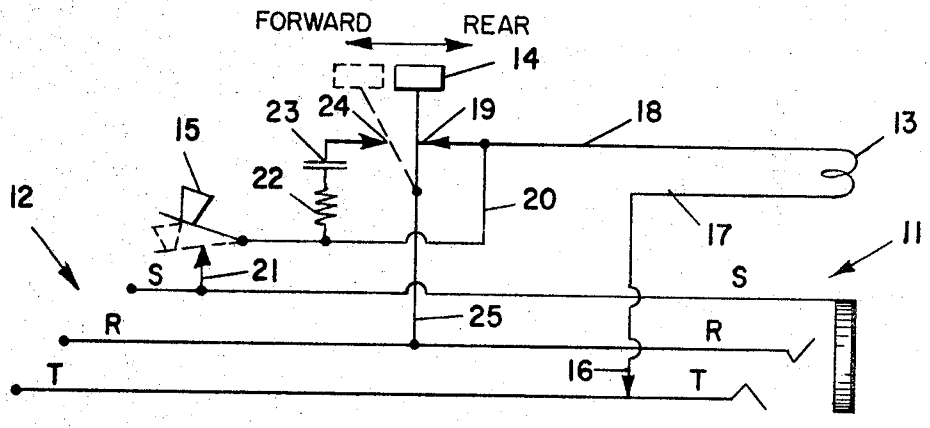
FIGURE 2 is a schematic electrical circuit diagram of the various components incorporated in the unit shown in FIGURE 1.

Referring now to FIGURE 2, the inlet jack 11 and outlet plug 12 are connected together by tip, ring, and sleeve conductors designated T, R, and S respectively. One side of the light bulb 13 is adapted to be connected to the tip conductor T as by switch contact 16 and conductor 17. The arrangement is such that when a plug is inserted in the jack 11, the connection between the tip conductor T and the one side of the lamp 13 will be broken by the separation of the contact 16 from the tip conductor. Removal of a plug from the jack 11 will re-establish the connection of the tip conductor to the one side of the lamp 13.

The other side of the lamp 13 connects through a conductor 18 to a rear contact 19 for the slide switch 14. As shown, this rear contact 19 connects through a branch lead 20 to the push button switch 15. The other side of the push button switch 15, shown at 21, connects to the sleeve conductor S. It will be clear that depression of the push button switch 15 will thus connect the sleeve conductor S to the line 18 connecting to the lamp 13.

The unit is completed by a series circuit including a resistance 22 and condenser 23 connecting to a forward contact 24 for the slide switch 14 and a line 25 from the slide switch to the ring conductor R. Movement of the slide switch 14 to a forward position serves to connect the ring conductor R through the line 25 to the forward contact 24, through the series circuit, and back through the line 20 to the lamp 13. When the slide switch 14 is in the rear position shown, the ring conductor R is connected directly through the line 25 and conductor 18 to the lamp 13.

With the foregoing description in mind, the operation of the telephone line testing unit will now be described. Assume first it is desired to test a subscriber's line at a telephone answering exchange. The operator, with the slide switch 14 in the rear or solid line position and without any plug being received in the jack 11, will insert the outlet plug 12 into the subscriber's line jack in the switchboard. With reference to FIGURE 2, it will be noted that any voltage in the subscriber's jack existing across the tip and ring terminals will be passed by the tip and ring conductors T and R to the lamp 13 through the contact 16 and line 17 to the lower or one side of the lamp and through the line 25 and conductor 18 to the other side of the lamp. If the light 13 is energized, the operator will be advised that the line itself is in working order.

If no light appears in the unit, the operator then presses the push button switch 15. Again, with reference to FIGURE 2, it wil be noted that depressing the button 15 serves to connect the sleeve conductor S through the contact 21 and line 20 to the conductor 18 and thus effectively connecting the tip and sleeve conductors of the subscriber's jack across the lamp. In some types of boards, voltage for lighting the indicating lamp is provided across the tip and sleeve conductors. Therefore, if the light is energized when the push button is pressed, the operator will be apprised that the line is in working order.

From the foregoing, it will thus be seen that a very quick test may be readily made to determine whether a line is out of order. Thus, if the light bulb 13 is not energized when the slide switch is in a rear position and the button is either left open or depressed; that is, if the light is not energized under either of these conditions, the line is out of order and steps may be taken to repair the line.

Assume now that the light does appear in the unit. The operator can then further test the subscriber's line by leaving the button switch 15 up or open and sliding the switch 14 forward to place the resistance 22 and condenser 23 in series with the lamp. The condenser will block the D-C tip and ring voltage so that the lamp is extinguished. The operator then effects a dialed out call on the line. If this dialed out call on the line does not "ring in" on the board; that is, if there is no indication by the switchboard lamp that a "dialed out call" is being received, when there is such an indication by energiaztion of the lamp 13 by the A-C ring voltage, the operator is apprised that the trouble is because of a burned-out switchboard lamp.

In the case of a burned-out switchboard lamp, service may be restored immediately on the line by leaving the unit plugged into the line and moving the slide switch 14 to its forward position. When the slide switch 14 is in the forward position, the series resistance and condenser circuit 22 and 23 is connected between the ring conductor and the lamp 13 through the conductor 20 and lead 18. The condenser will serve to block the normal D-C tip and ring voltage so that the lamp will not be lit. However, the lamp 13 will be energized immediately upon receipt of an incoming call when the ring current is A-C and the operator can intercept the call in the usual manner by inserting her plug in the inlet jack 11 the same as she would ordinarily insert her plug into the subscriber's jack. Thus, the lamp 13 will function to replace the burned-out lamp until a new one can be placed in the switchboard.

A further feature of the unit is the provision of the series circuit to intercept a "dialed out" call. This series circuit permits the lamp 13 to follow the ring in such a manner that the light will be energized on the very first ring so that the exchange operator may intercept the call immediately if she has been so instructed.

On certain other lines in which concentrator identifier equipment is used, the service to a subscriber may be restored instantly in the event of a burned-out switchboard lamp by placing the slide switch 14 in the rear position and the light 13 will be energized on the very first ring.

In the first instance in which the slide switch 14 is in the forward position, the light will follow the ring as normally established on local boards as opposed to the concentrator identifier type of equipment.

For switchboard lines incorporating a "secrecy feature" circuit, and on certain lines generally known as "business answering lines" which terminate only in the switchboard itself, there is usually not provided any tip and ring voltage for energizing of the lamp 13. For these boards, the push button 15 should be then depressed to effectively connect the lamp 13 across the sleeve and tip conductors.

From the foregoing description, it will thus be evident that the present invention has provided a novel telephone line testing unit. Not only is the unit adaptable to various different types of switchboards as used across the country, but it provides the further features of enabling calls to be intercepted on the very first ring and also to enable instant restoration of service in the event that a switchboard lamp has become burned out. The end result is greatly improved telephone answering service for subscribers.

What is claimed is:

1. A telephone line testing unit including, in combination: a casing including an inlet jack and an outlet plug; tip, ring, and sleeve conductors connecting said inlet jack to said outlet plug; an indicating means; first switch means connecting one side of said indicating means to said tip conductor and responsive to insertion of a plug in said inlet jack to open the connection from said one side of said indicating means to said tip conductor; second switch means adapted to connect the other side of said indicating means to said ring conductor when in a first position, whereby insertion of said plug into a subscriber's line jack with said second switch means in said first position connects any existing tip and ring voltage in said subscriber's line across said indicating means; and a third switch means connected between said other side of said indicating means and said sleeve conductor, closing of said third switch means connecting any existing tip and sleeve voltage in said subscriber's line across said indicating means.

2. A telephone line testing unit comprising, in combination: a casing including an inlet jack and an outlet plug; tip, ring, and sleeve conductors connecting said inlet jack to said outlet plug; a slide switch connected to said ring conductor and having rear and forward contacts; a light bulb; contact means normally connecting one side of said light bulb to said tip conductor and adapted to break its connection thereto in response to insertion of a plug into said jack, the other side of said light bulb connecting to said rear contact; a push button switch connected between said sleeve conductor and said rear contact; and a series circuit including a resistance and condenser connected between said push button switch and said forward contact.

References Cited

UNITED STATES PATENTS 1,820,116 8/1931 Burns ------------ 179—175.1

KATHLEEN H. CLAFFY, *Primary Examiner.*

A. A. McGILL, *Assistant Examiner.*